Figures 1, 2:
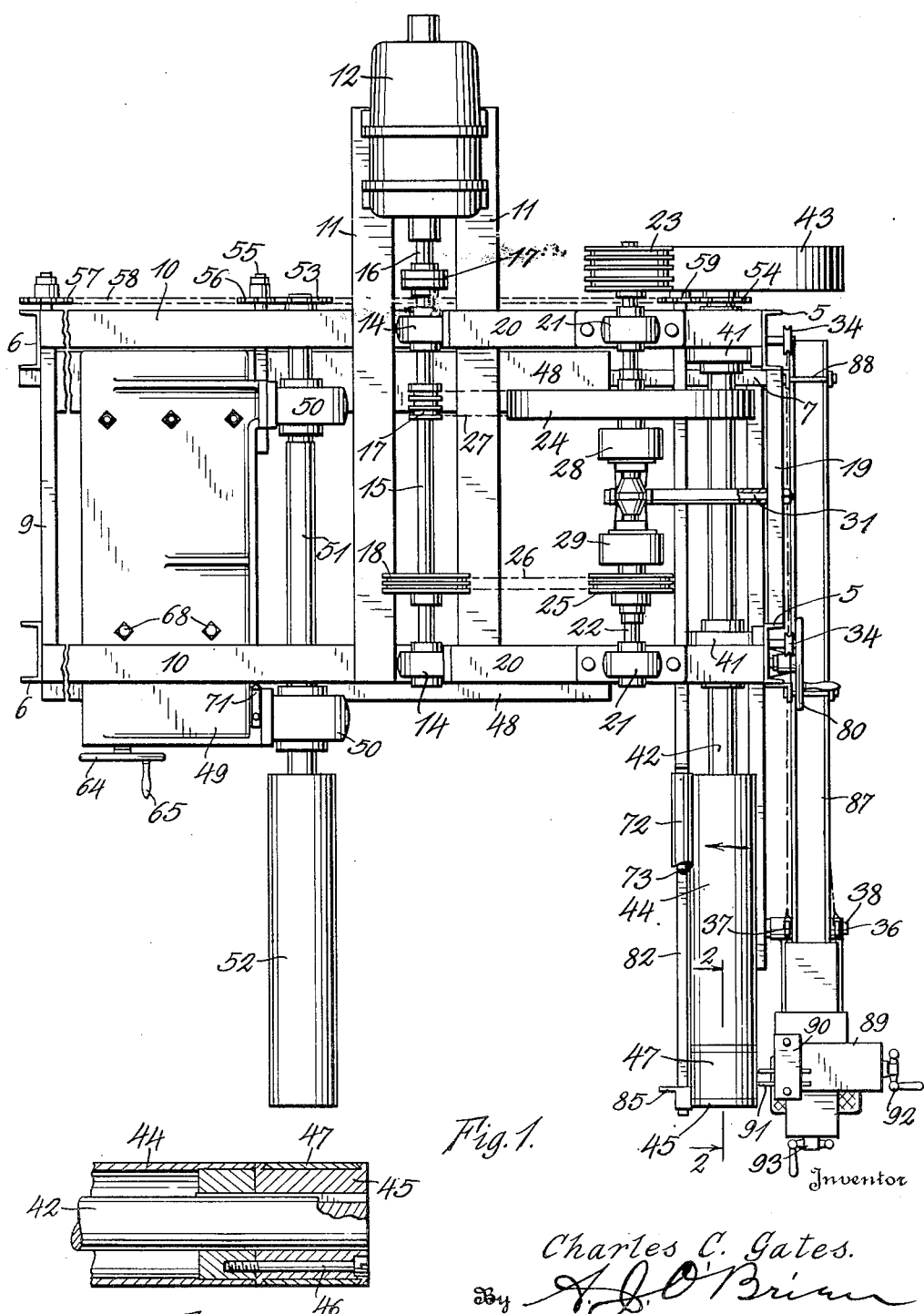

May 30, 1933.  C. C. GATES  1,911,185
MACHINE FOR MAKING ENDLESS BELTS
Filed Dec. 4, 1931  4 Sheets-Sheet 1

Inventor
Charles C. Gates.
By A. J. O'Brien
Attorney

May 30, 1933.  C. C. GATES  1,911,185
MACHINE FOR MAKING ENDLESS BELTS
Filed Dec. 4, 1931  4 Sheets-Sheet 2
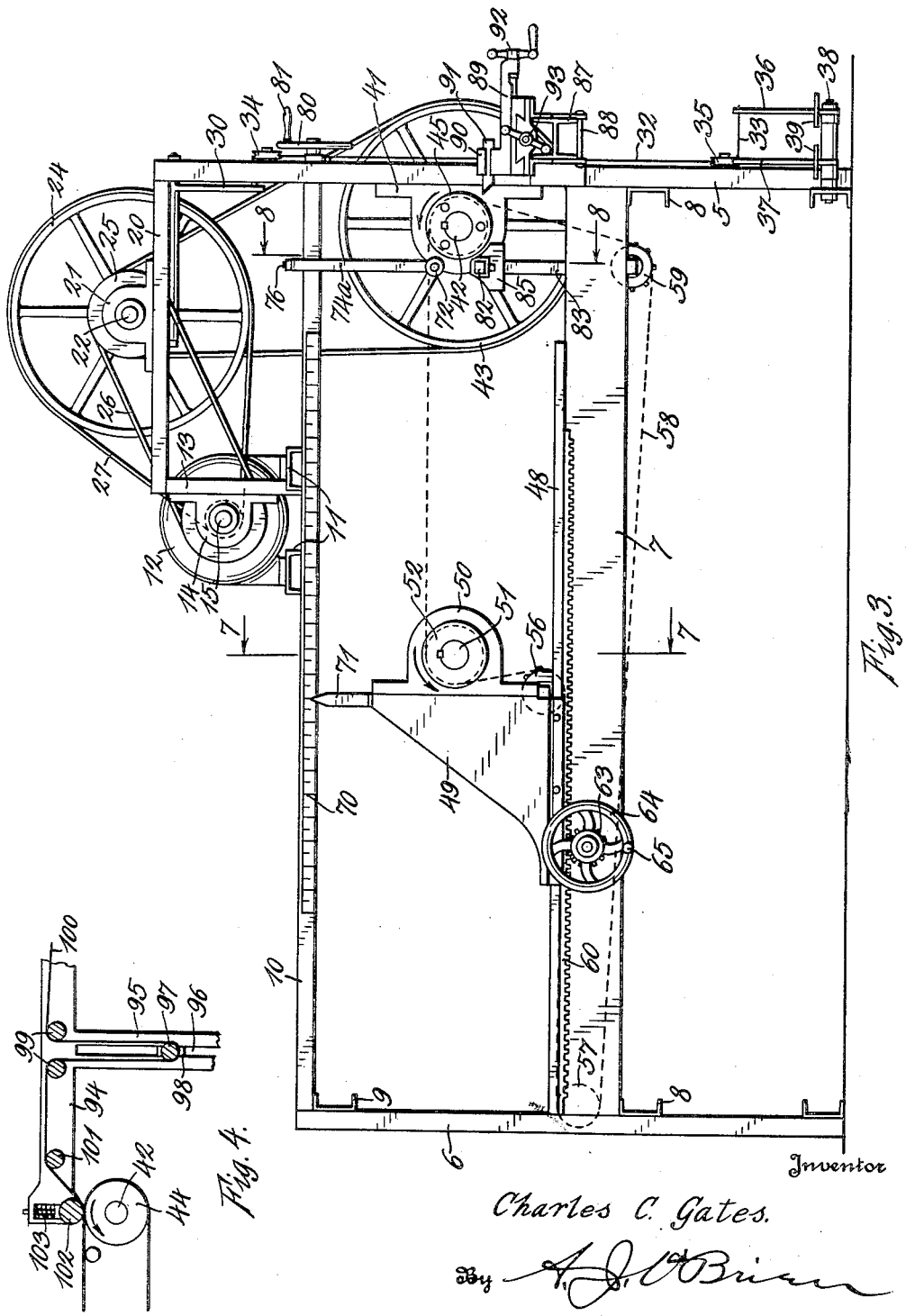
Inventor
Charles C. Gates.
By A. J. O'Brien
Attorney May 30, 1933.     C. C. GATES     1,911,185
MACHINE FOR MAKING ENDLESS BELTS
Filed Dec. 4, 1931     4 Sheets-Sheet 3
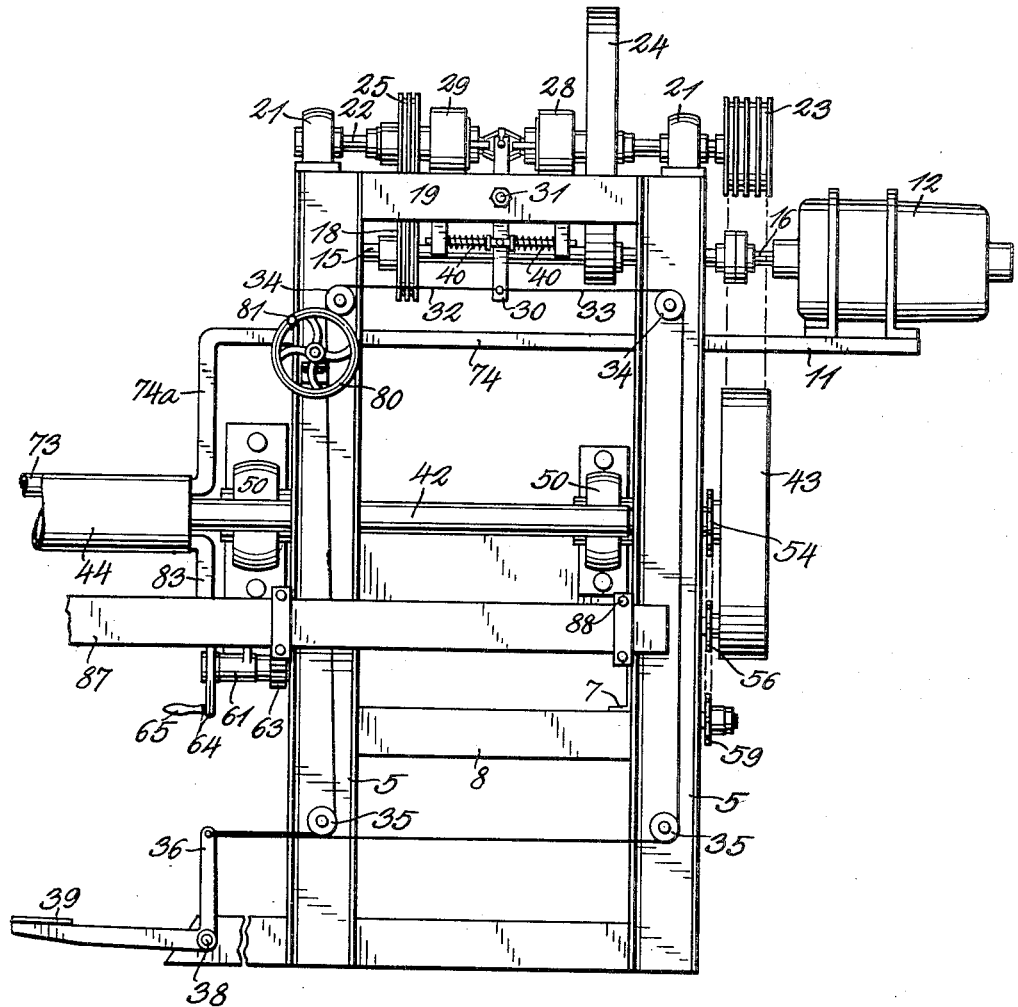
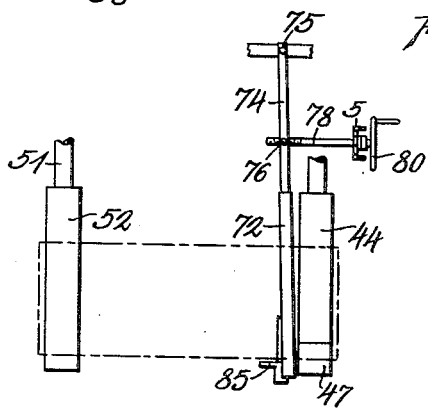
Fig.5.
Fig.6.
Inventor
Charles C. Gates.
By A. D. O'Brien
Attorney May 30, 1933.  C. C. GATES  1,911,185
MACHINE FOR MAKING ENDLESS BELTS
Filed Dec. 4, 1931  4 Sheets-Sheet 4
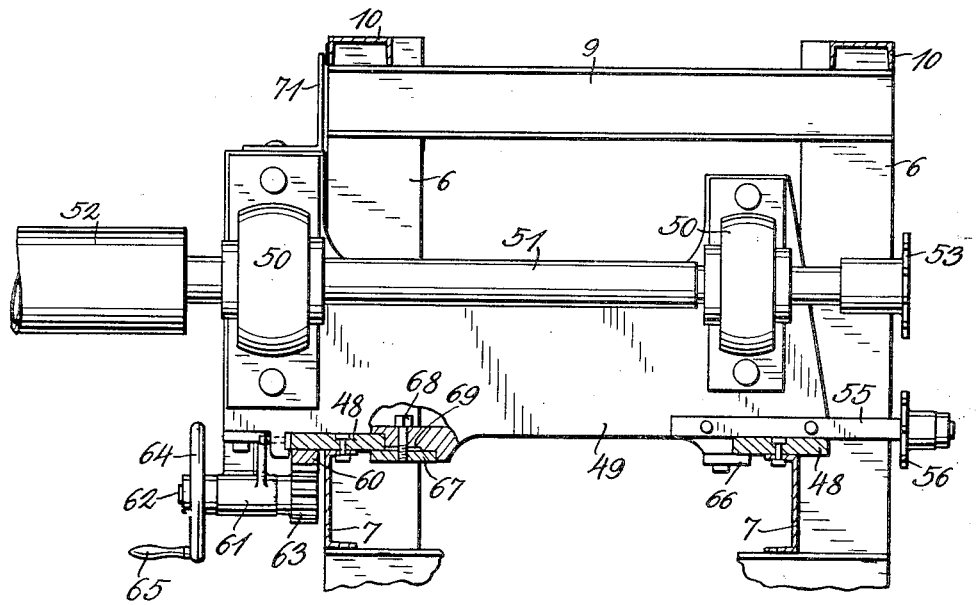
Fig. 7.
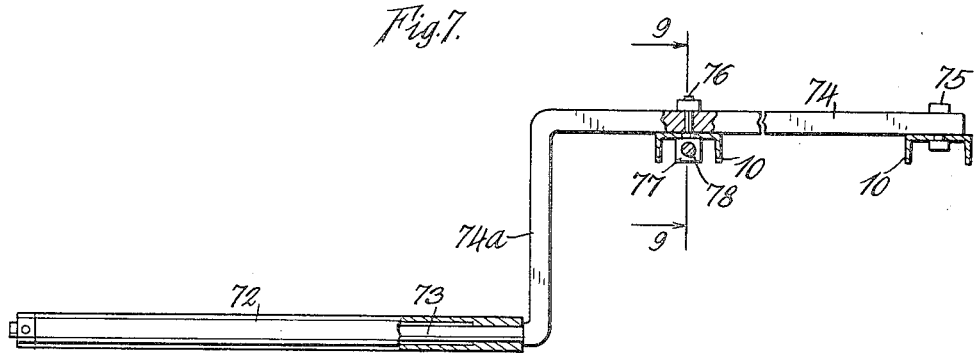
Fig. 8.
Fig. 9.
Inventor
Charles C. Gates.
By A. J. O'Brien
Attorney Patented May 30, 1933

1,911,185

UNITED STATES PATENT OFFICE

CHARLES C. GATES, OF DENVER, COLORADO

MACHINE FOR MAKING ENDLESS BELTS

Application filed December 4, 1931. Serial No. 579,063.

This invention relates to improvements in machines for making endless belts.

In the design of machinery, the use of grooved pulleys and side driving belts is increasing with the result that an enormous number of belts of this type are now used.

It is the object of this invention to produce a simple and substantial machine by means of which rubber composition V-shaped belts can readily be built up in large numbers with a minimum amount of labor and expense.

Another object of this invention is to produce a machine that is adjustable so that it can be employed for making belts of any length desired.

The above and other objects that may become apparent as this description proceeds are attained by means of a construction which, briefly described, consists of a stationary supporting frame having a transversely extending shaft mounted for rotation therein and projecting from one side of the frame. The frame is also provided with a carriage that can be moved in a direction at right angles to the shaft. A second shaft is rotatably supported by the carriage and the two projecting ends of these shafts are provided with drums about which the material from which the belt is made is wound. Means is provided for rotating the two drums in the same direction and at the same peripheral speed and for changing the speed of rotation and also for cutting the material into strips of suitable widths for belt cores.

Having thus very briefly described the invention, the same will now be described in detail and for this purpose reference will be had to the accompanying drawings in which the preferred embodiment of the machine has been illustrated, and in which:

Fig. 1 is a top plan view of the machine;
Fig. 2 is a section taken on line 2—2, Fig. 1, and shows a detachable portion of one of the rollers that is especially designed for cooperating with the cutting means;
Fig. 3 is a side elevation of the machine;
Fig. 4 is a section showing a portion of a cooperating material rack;
Fig. 5 is an end view of the machine;
Fig. 6 is a detailed view showing means for shifting the supporting roller;
Fig. 7 is a section taken on line 7—7, Fig. 3, and shows the means for moving the carriage and for clamping it in adjusted position;
Fig. 8 is a view showing the relative position of the supporting roller and the stop member; and
Fig. 9 is a section taken on line 9—9, Fig. 8, and shows the means employed for shifting the axis of the supporting roller.

The machine consists of a stationary frame which comprises four supports that have been indicated by reference numerals 5 and 6. The two end supports 5 are higher than those indicated by reference numeral 6. The two supports 5 and 6 on each side of the machine are connected by means of channels 7 which form the side members of the frame and other channels 8 extend transversely between the supports at each end. At the upper ends of support 6, channels 9 are secured and extending from these to the supports 5 are channels 10 that are preferably placed with their flanges extending downwardly as indicated in Fig. 8. Supported on the channels 10 are transversely extending channels 11 that project to one side of the machine in the manner shown in Fig. 1 and serve as supports for the motor 12. Secured to the upwardly extending channels 13 are bearings 14 in which the driving shaft 15 is journalled. This shaft is connected at one end to the motor shaft 16 by means of a coupling 17'. Secured to shaft 15 are two grooved pulleys 17 and 18. In the embodiment shown on the drawings, the pulley numbered 17 is smaller than the one numbered 18, but the exact size of these two pulleys does not form a part of this invention. Connecting the upper ends of the supports 5 is a channel or other supporting member 19, and extending from the supports 13 to the upper ends of members 5 are channels 20 to the upper surface of which bearings 21 are secured. A shaft 22 is journalled in bearings 21 and extends to the outside of the frame on the side at which the motor is located. The outer end carries a grooved pulley 23. Rotatably mounted on shaft 22 are two pulleys 24 and 25. Pulley 24 is of considerable size and has a flat driving surface, while pulley 25 is smaller and has a grooved surface to correspond to the grooves in pulley 18 and these two pulleys are connected by means of side driving belts 26. Pulleys 17 and 24 are connected by side driving belts 27. Since only one of these pulleys is grooved, the belts will drive with their inner surface when passing around pulley 24, and with their sides when passing around pulley 17. Two clutches 28 and 29 are carried by the shaft 22 and are so arranged that when both of them are in inoperative position, the pulleys 24 and 26 can rotate freely on the shaft. But by closing either one of the clutches the corresponding pulley will be secured to the upper shaft and therefore when pulley 24 is connected to the shaft by means of clutch 28, this shaft will rotate at a certain speed, but if clutch 29 is closed and clutch 28 open, the shaft will rotate much faster. The difference in the speed of rotation is controlled by the size of the pulleys in a well known manner and no need is seen for explaining this in any greater detail.

Clutches 28 and 29 are operated by means of a lever 30 that is pivoted at 31. Two ropes 32 and 33 are connected to the lower end of this lever and after passing about pulleys 34 and 35 are connected to the upper ends 36 and 37 of two bell crank levers that are pivoted at 38. Each of these levers has a pedal 39 and by pressing down on either one of these pedals, the operator can close either one of the clutches. Springs 40 tend to hold the lever 30 in neutral position.

Secured to the uprights 5 are bearings 41 in which shaft 42 is journalled. One end of this shaft is provided with a pulley 43 that is located so that belts are passed around this pulley and pulley 23. Shaft 42 projects from the front side of the machine and secured to the projected end of this shaft is a drum 44. This drum consists of two parts, the outer of which has been designated by reference numeral 45 and this is secured to the end of drum 44 by means of bolts 46. The outer surface of section 45 is provided with a layer of hard rubber 47. The purpose of this hard rubber layer will appear as the description proceeds. When the parts are assembled as described and the belts are connected between pulleys 23 and 43, it is evident that when the motor is operated, shaft 42 will be rotated in one direction or the other, depending upon the direction in which the motor turns. When the machine is used for forming a belt, drum 44 is rotated in the direction of the arrow in Figs. 1 and 3. But by reversing the motor, it may be rotated in the opposite direction, if, for any reason, this should be necessary.

Secured to the upper flange of each of the side members 7 is a plate 48. These plates are so located that their adjacent edges are parallel and so located that they form guides for a carriage 49 to which the bearings 50 are secured. Journalled in the bearings is a shaft 51 that extends to one side of the machine and carries a drum 52 that is usually the same size as drum 44, but does not necessarily have to be the same size. The end of the shaft opposite from that to which the drum is secured is provided with a sprocket wheel 53. A similar sprocket wheel 54 is connected with shaft 42 between pulley 43, and the frame. Carried by the carriage 49 is a journal 55 to the outer end of which a sprocket wheel 56 is rotatably secured. At the end of the frame a similar sprocket wheel 57 is mounted. A sprocket chain 58 encircles the sprocket wheels 53, 54, 56 and 57 and this chain also passes around a sprocket wheel 59 in the manner shown by dotted lines in Fig. 3. When the chain is connected in the manner shown and described, the carriage 49 can be moved along the frame without altering the length of the chain and therefore the chain drive is operative regardless of the position of the carriage. When drums 52 and 57 are of the same size, sprocket wheels 53 and 54 are also of the same size and therefore whenever shaft 42 rotates, shaft 51 will be rotated in the same direction and at such a speed that the drums will have the same peripheral speed. Secured to the under surface of one of the plates 48 is a rack 60 and secured to the end of the carriage that projects beyond the frame, is a bearing 61 in which is rotatably mounted a shaft 62. Secured to one end of this shaft is a pinion 63 that cooperates with the rack. A handwheel 64 provided with a handle 65, is secured to the outer end of shaft 62 and serves as a means for moving the carriage along the frame. For the purpose of holding the carriage securely on the guides, a plate 66 has been fastened to the under side of the carriage by means of a bolt and another plate 67 is secured to the under side of the carriage and overlaps the edge of the other guide plate. Plate 67 is held in place by means of a bolt 68 that can be tightened for the purpose of clamping this plate against the under surface of bar 48. A clearance space 69 is provided to permit this clamping action. After the carriage has been adjusted, bolt 68 is rotated to tighten the plate 67 against the bar 48 and the carriage will therefore be clamped against accidental movement. Secured to one side of the frame member 10 is a steel scale 70 that is graduated in such a way that the graduations correspond to the length of the belt to be made. A pointer 71 is carried by the carriage and extends up to the scale and this serves to facilitate the adjustment of the plates for the manufacture of belts of different lengths.

Located between the drums 47 and 52 is a guide roller 72 that is mounted for rotation on an arm 73.

Referring more particularly now to Fig. 8, it will be seen that arm 73 is part of a Z-shaped bar having a straight portion 74 that extends over the two frame members 10 and which is pivotally connected at its end to one of the frame members by means of a bolt 75. The other frame member has a slot through which a bolt 76 extends. This bolt passes through an opening in the bar 74 and its lower end is provided with a nut 77 for the reception of the threaded end of a screw 78. This screw is mounted for rotation in a bearing 79 that is secured to one of the uprights 5 and is provided with a handwheel 80 having a handle 81. When screw 78 is rotated, the nut 77 will be moved in the direction of the axis of the screw and in this way the bar 74 will be turned about its pivot and since the end of this bar is connected with the arm 73 by means of a straight portion 74a it is evident that by turning the screw 78, it is possible to change the angular relation between the arm 73 and the axes about which the drums 44 and 52 rotate. The roller 72 is so located that its upper surface is tangent to a plane that is also tangent to the upper surface of the two drums and this roller therefore serves to support the belt material in a manner which will become more apparent as this description proceeds. A Z-shaped bar having an arm 82 that extends from the frame at a point between the drums and the connected portion 83 is secured to the upper flanges of members 7 by means of bolts 84. Secured to the outer end of this arm is a stop plate 85 that is held in adjusted position by means of a set screw 86.

Secured to the end supports 5 is an I-beam 87. This beam is preferably held in place by means of clamping bolts 88, as shown in Fig. 3. Secured to this beam is a cross head 89 like that employed on a lathe and which has a clamping device 90 corresponding to the tool post of a lathe and by means of which knife 91 is secured to the cross head. This cross head is provided with means 92 for feeding the knife towards and away from drum 44 and with other means 93 for moving the tool post in the direction of the length of the roller. This cutting device is used for cutting the belt material into strips as will hereinafter more clearly appear. At this point it might be mentioned that the hard rubber cover 47 is placed on the outside of this section of the drum so that when the knives are used for cutting the material, they will not be dulled by coming in contact with a hard metal surface and the cutting is therefore done over the hard rubber covering. When this covering is destroyed, section 45 can be removed and replaced by another, while the rubber covering is replaced.

The material that is employed in building up the core is contained in big rolls located on a material rack which has not been shown in the drawings, but in Fig. 4 a portion of this material rack has been shown in its relation to the drum 44 for the purpose of better explaining the operation.

In Fig. 4 reference numeral 94 represents a part of the material rack and this is provided with a downwardly extending arm 95 having a slot 96. A weighted roller 97 is mounted for rotation in bearings 98 that are slidable in the slots. Mounted for rotation in bearings carried by member 94 are two rollers 99 and the material 100 passes over one of these rollers and thence passes downwardly about roller 97, thence upwardly about the other roller 99 from which it passes over a similar roller 101 and thence under a roller 102 that is located directly above the drum 44. Roller 102 is pressed against the upper surface of drum 44 by means of a spring 103 and therefore when the machine is operating the material will be pressed against the drum and smoothed by roller 102. The tension is controlled by the weight attached to the roller 97 and as this floats in the slot 96, the tension remains the same, regardless of the position of this roller.

In a copending application the material rack is shown and described and the means by which the tension is maintained constant is also described.

Let us now assume that the two drums 44 and 52 have been adjusted so as to make a belt of the length desired and that we are about to commence the building up of a core. The core is preferably formed from layers of bias cut rubberized fabric separated by latex-treated cord fabric in which the cords are located between an equal number of layers of fabric, the cords forming a substantially inextensible center that serves as the neutral axis for the belt. The material rack is first adjusted so as to bring a rubberized fabric into position. This fabric is usually bias cut so that the warp and woof extends at forty-five degrees to the length of the material. The drums are rotated in a counterclockwise direction, Fig. 4, and the material is brought around the two drums and back underneath the place where the material is fed onto the drum and after one complete layer has thus been formed, as many layers of this fabric can be placed one on top of the other, as may be desired. After two or three layers of rubberized fabric have been put in place, this material is cut and the material rack is moved so as to bring the cord fabric into place and one or more layers of this cord fabric is then superimposed on the first layer of rubberized fabric. After the required amount of cord fabric has been put in place, the material rack is again shifted and two or more layers of rubberized fabric is put on top of the cords. After the material for the cord has thus been built up and the several layers pressed together, the material rack is removed and the cutting knives adjusted for the purpose of cutting this wide strip into narrow strips of the proper width for the belts that are to be made. When the material is to be cut, the speed of the drums is increased and the angular position of roller 72 adjusted so as to bring the edge of the material against the stop 85. By means of the cutting knives shown in the drawings, one or more strips can be cut at one time from the broad strip of material, and as these are removed, the material will automatically be fed against the stop 85, and in this way the whole width of the broad strip is cut into narrow strips, which are then taken to another machine and covered with bias cut rubberized fabric, after which they are put into a mould of the proper size and shape and vulcanized. The method of forming the belt after the cord has been made, is described and claimed in a copending application.

From the above description it will be apparent that this machine is especially well adapted for forming cores for rubberized belts and that by means of this machine, the core material can be readily wrapped to any desired thickness, and conveniently and easily cut into strips of the desired width. This machine, as has been above intimated, can be used for making belts of any desired length and the drums about which the material is wrapped are movable with respect to each other. When very long belts are made, it is necessary to provide some intermediate supports corresponding to the roller 72 so as to support the upper and the lower horizontal portions of the belt and keep them from stretching. These supports have not been shown here because with the machine here described they are not necessary, but wherever they are necessary they should be provided.

Having described the invention what is claimed as new is:

1. A machine for use in making belts, comprising, a frame, two drums mounted for rotation about spaced parallel axes, means for simultaneously rotating the drums in the same direction and at the same peripheral speed, and means for shifting the axes of the drums relative to each other while maintaining them parallel.

2. A machine for use in making belts comprising, a frame, a shaft extending transversely of the frame and mounted for rotation, a carriage movably connected with the frame, means for moving the carriage in a direction perpendicular to the axis of the shaft, a second shaft mounted for rotation in the movable carriage, the axes of the shafts being parallel, a drum secured to each shaft, a power transmitting mechanism for producing simultaneous rotation of the drums in the same direction and at the same peripheral speed, and means for clamping the movable carriage in adjusted position.

3. A machine for use in making belts comprising a frame, two drums mounted for rotation about spaced parallel axes, means for rotating the drums simultaneously in the same direction and at the same peripheral speed, a third drum located between the first mentioned drums, the upper surface of the third drum lying in the plane tangent to the upper surfaces of the other drums, and means for adjusting the axis of the third drum relative to the axes of the other drums.

4. A machine for use in making belts comprising, in combination, a supporting frame, a shaft carried by the frame and mounted for rotation about its own axis, a carriage carried by the frame and mounted for movement in a direction perpendicular to the axis of the shaft, means for moving the carriage, means for clamping the carriage to the frame, a shaft carried by the carriage and mounted for rotation about an axis parallel to the axis of the first shaft, a drum secured to each shaft, means for simultaneously rotating the drums in the same direction and at the same peripheral speed, a third drum mounted for rotation about an axis parallel with the plane containing the axis of the two shafts, the upper surface of the third drum being tangent to a plane tangent to the upper surfaces of the other two drums, and means for changing the angular relation between the axis of the third drum and the axes of the other two drums.

5. A machine for use in making belts comprising, in combination, a supporting frame, a shaft carried by the frame and mounted for rotation about its own axis, a carriage carried by the frame and mounted for movement in a direction perpendicular to the axis of the shaft, means for moving the carriage, means for clamping the carriage to the frame, a shaft carried by the carriage and mounted for rotation about an axis parallel to the axis of the first shaft, a drum secured to each shaft, means for simultaneously rotating the drums in the same direction and at the same peripheral speed, a third drum mounted for rotation about an axis parallel with the plane containing the axes of the two shafts, the upper surface of the third drum being tangent to a plane tangent to the upper surfaces of the other two drums and means for shifting the axis of the third drum in a plane parallel to the plane containing the axis of the other drum.

6. A machine for use in making belts comprising, in combination, a supporting frame, a shaft carried by the frame and mounted for rotation about its own axis, a carriage carried by the frame and mounted for movement in a direction perpendicular to the axis of the shaft, means for moving the carriage, means for clamping the carriage to the frame, a shaft carried by the carriage and mounted for rotation about an axis parallel to the axis of the first shaft, a drum secured to each shaft, means for simultaneously rotating the drums in the same direction and at the same peripheral speed, a third drum mounted for rotation about an axis parallel with the plane containing the axes of the two shafts, the upper surface of the third drum being tangent to a plane tangent to the upper surfaces of the other two drums, the shaft on which the third drum is carried having one end pivoted to the frame and means for moving it about its pivot while its axis remains in a plane parallel to the plane containing the axes of the other two shafts.

7. A machine for use in making belts comprising, in combination, a supporting frame, a shaft carried by the frame and mounted for rotation about its own axis, a carriage carried by the frame and mounted for movement in a direction perpendicular to the axis of the shaft, means for moving the carriage, means for clamping the carriage to the frame, a shaft carried by the carriage and mounted for rotation about an axis parallel to the axis of the first shaft, a drum secured to each shaft, means for simultaneously rotating the drums in the same directions and at the same peripheral speed, a third drum mounted for rotation about an axis parallel with the plane containing the axes of the two shafts, the upper surface of the third drum being tangent to a plane tangent to the upper surfaces of the other two drums, the shaft on which the third drum is carried having one end pivoted to the frame and means for moving it about its pivot while its axis remains in a plane parallel to the plane containing the axes of the other two shafts, said last named means comprising, a nut carried by the shaft between the pivot and the adjacent end of the drum and a screw rotatably secured to the frame and mounted for rotation, the screw having threaded connection with the nut whereby the shaft will be moved about its pivot when the screw is rotated.

8. A machine for use in making belts comprising, in combination, a supporting frame, a drive shaft extending transversely of the frame, two driven shafts mounted for rotation on and projecting to one side of the frame, a drum on the outer end of each of said shafts, means for transmitting motion from one of the driven shafts to the other so that they will rotate simultaneously in the same direction and at the same peripheral speed, a countershaft located between the driving and one of the driven shafts, a large pulley and a small pulley rotatably mounted thereon, a clutch between the shaft and each of the pulleys, means for operating the clutches so as to connect either of the pulleys to the shaft, the driving shaft having two pulleys of substantially the same size, belt connections between the corresponding pulleys on the drive and the countershaft and means for transmitting power from the countershaft to one driven shaft.

In testimony whereof I affix my signature.

CHARLES C. GATES.